United States Patent [19] [11] 3,870,249

Schrader et al. [45] Mar. 11, 1975

[54] CONTROLLED FRICTION TAPE ROLLER

[75] Inventors: William A. Schrader, Mission Viejo; Joe Schmidt, Fullerton, both of Calif.

[73] Assignee: Ex-Cell-O Corporation, Detroit, Mich.

[22] Filed: Oct. 24, 1973

[21] Appl. No.: 409,081

[52] U.S. Cl. .................................. 242/201, 242/75.4

[51] Int. Cl. ... B11b 15/32, G03b 1/04, B65h 23/06

[58] Field of Search ............................ 242/201–210, 242/75–75.4; 226/39, 19.5

[56] References Cited

UNITED STATES PATENTS

| | | | |
|---|---|---|---|
| 2,099,376 | 11/1937 | Shapiro | 242/75.2 X |
| 2,838,250 | 6/1958 | Stavrakis et al. | 242/207 |
| 3,250,488 | 5/1966 | Prager | 242/75.4 |

*Primary Examiner*—Leonard D. Christian
*Attorney, Agent, or Firm*—Christie, Parker & Hale

[57] ABSTRACT

A controlled friction tape roller for a tape transport system for reel to reel operations is described. A controlled friction tape roller is arranged adjacent a tape reel to introduce a high tension in the tape extending between the reel and the controlled friction roller to allow the tape to be more tightly wound or packed on the reel.

7 Claims, 4 Drawing Figures

CONTROLLED FRICTION TAPE ROLLER

This invention relates to transport apparatus and more particularly to an arrangement for controlling the friction exerted on the tape of the apparatus for tightly packing the tape on a tape storage reel.

Tape transports for transferring tape from one reel to another reel are well known in the art. One such prior art tape transport apparatus is disclosed in U.S. Pat. No. 3,717,316. In these prior art types of tape drive mechanisms it is necessary to maintain low tape tension in order to obtain optimum speed of response of the associated tape transport control systems. This is particularly necessary in tape transports that employ incremental drive techniques. When low tape tensions are employed in a tape transport system it produces very poor packing or winding of the tape on the supply reel as a result of which it has been found necessary to provide better packing of the tape on a take-up reel.

The present invention provides an improved and inexpensive controlled friction tape roller that allows low tape tension to be employed to maintain the present day responses of the tape transport control systems and yet provides high tape tension for tape storage purposes by isolating the tape drive and take-up functions. The controlled friction tape roller may readily and inexpensively be incorporated into the present day tape transport systems.

From a structural standpoint, the present invention comprehends a reel to reel tape transport system for transferring tape from one storage reel to another storage reel including a pair of rotatable tape storage reels mounted in a spaced apart relationship and having tape extending between the reels. The storage reels each have means for driving them to transfer the tape between the reels. Tape guide means are mounted adjacent each of the reels to provide the desirable amount of low tension on the tape along with tape tensioning means arranged between the tape guide means and at least one of the storage reels for increasing the tape tension of the tape extending between one of the reels functioning as a take-up reel and the tape tensioning means so as to allow the tape to be tightly wound thereon. Specifically, the tape tensioning means may comprehend a rotatable roller over which the tape is conveyed in a nonslipping fashion thereover so as to rotate the roller and includes means for selectively controlling the amount of drag required to rotate the roller by the tape advancing thereby and thereby controlling the amount of tension on the tape and the packing of the tape on a take-up reel.

These and other features of the present invention may be more fully appreciated when considered in the light of the following specification and drawings, in which.

Figure 1:
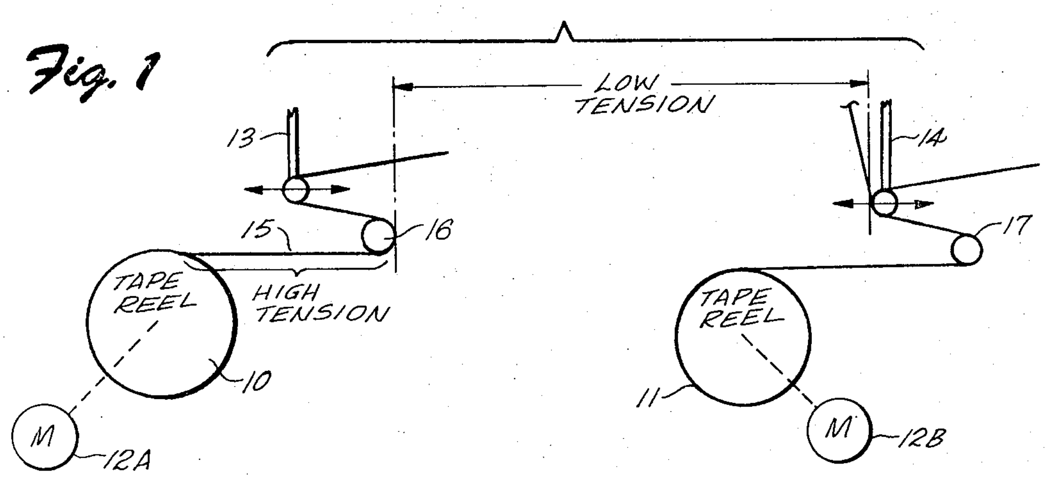
FIG. 1 is a schematic representation, with portions broken away, of a tape transport system embodying the present invention.

Now referring to the drawings, the invention will be examined in detail. With particular reference to FIG. 1, it will be noted that there is illustrated the relevant portions of a conventional tape transport apparatus for transporting tape from one reel to another reel and illustrating the conventional tension arms normally arranged in the path of the tape as it is transported from reel to reel. A more detailed description of the tape transport system may be had by reference to U.S. Pat. No. 3,717,316. Only that portion of the conventional tape transport system necessary for appreciating the present invention is illustrated in FIG. 1. To this end, the tape reels are illustrated diagrammatically and identified by the reference numerals 10 and 11. Each tape reel is provided with a drive motor that is selectively energized for rotating the associated tape reel for winding tape thereon as is well understood in the arts. The motor 12A for the tape reel 10 is identified by the reference numeral 12A while the motor for the tape reel 11 is identified by the reference numeral 12B. The conventional tape tension or compliance arms having a tape guide roller associated therewith are identified by the reference numerals 13 and 14. It will be understood that the tape 15 which is transported between the reels 10 and 11 will be a continuous tape that will be conveyed through a tape reader or the like as described in the U.S. Pat. No. 3,716,316, for creating the demand for the tape and signalling the associated control system for controlling the direction the tape is transported from one reel to the other reel. The controlled friction rollers 16 and 17 are arranged between the tape reels 10 and 11 and the tension arms 13 and 14. The controlled friction tape rollers 16 and 17 are constructed in accordance with the present invention to provide the desired high tension on the portion of the tape 15 extending between the rollers 16 and 17 and the reels 10 and 11 respectively. In this fashion, it should be noted that the desirable low tension for the tape 15 extending between the controlled friction tension rollers 16 and 17 is provided while the necessary high tension is provided for that portion of the tape extending between the tape reels 10 and 11 and the rollers 16 and 17, as illustrated in FIG. 1.

Figure 2:
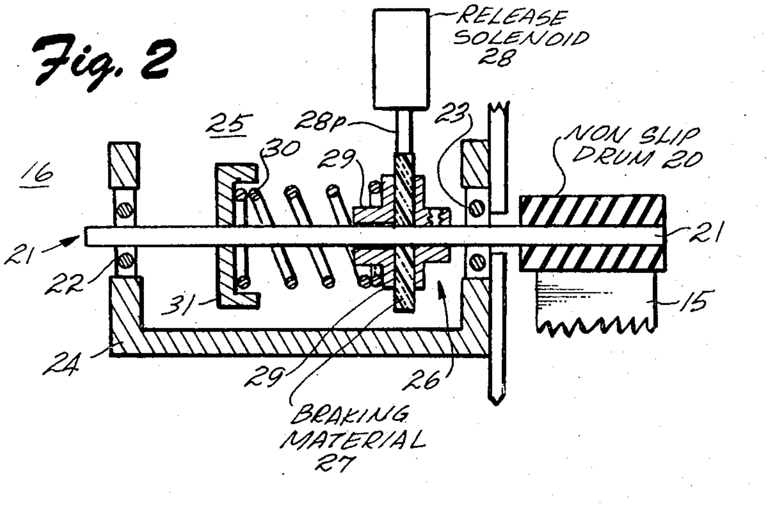
FIG. 2 is a cross-sectional view of a controlled friction tape roller of the present invention as utilized in the system of FIG. 1.
Figures 3, 4:
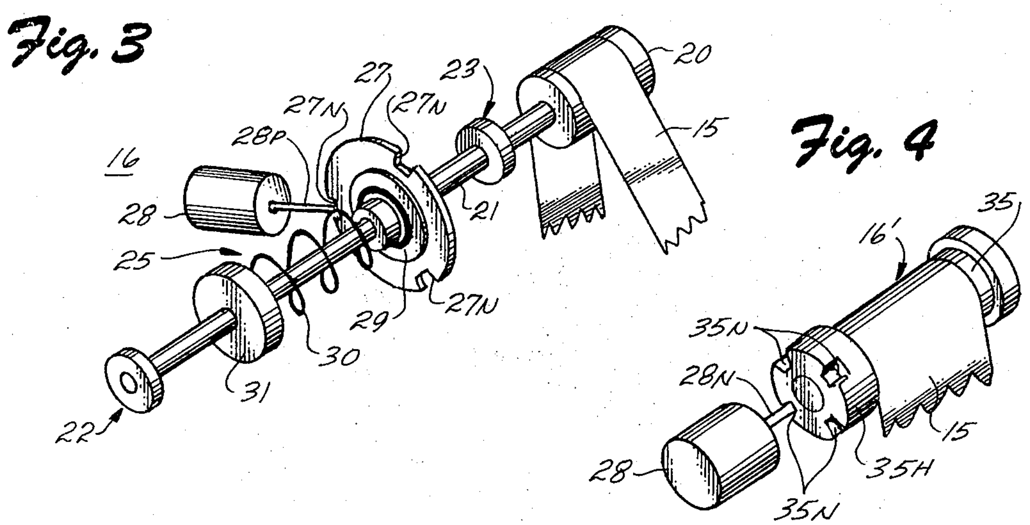
FIG. 3 is a perspective view of the controlled friction tape roller illustrated in FIG. 2.
FIG. 4 is a perspective view of another embodiment of a controlled friction tape roller in accordance with the present invention.

Now referring to FIGS. 2 and 3, the detailed construction of the controlled friction tape rollers 16 and 17 will be examined. The construction of both rollers 16 and 17 is identical and the construction of only one of the rollers need be considered. The construction illustrated for the roller 16 in FIGS. 2 and 3 is typical of a controlled friction tape roller embodying the present invention. The controlled friction tape roller 16 comprehends a non-slip drum 20 mounted on the end of a rotatable shaft 21. The rotatable shaft 21 is mounted between a pair of ball bearings 22 and 23 which are mounted to and carried by a bearing support bracket 24. The shaft 21 and the non-slip drum 20 secured thereto are free to rotate in unison. The tape 15 that is employed in the tape transport for purposes of the present invention will be a paper tape having the deisrable binary coded information recorded thereon. Accordingly, the tape may comprise various "paper" materials including mylar and the like, all of which are presently employed in commercially available "paper" tape transport systems. In order to provide a non-slipping relationship between the outer surface of the drum 20 and the tape 15, the drum may be constructed of a rubber roller mounted on the shaft 21 so as to afford sufficient friction between the tape 15 and the rubber drum 20 so as to prevent the tape from slipping over the drum in the normal operation of the apparatus. For the purposes of providing the necessary high tension to the tape extending between the controlled friction roller 16 and the tape reel 10, a friction brake apparatus 25 is provided. The friction brake apparatus 25 comprises a brake plate 26 secured to the shaft 21 adjacent a ball bearing 23. A brake disc constructed of a friction braking material and identified by the reference numeral 27 is mounted on the shaft 21 adjacent to the brake plate 26 and carries a floating brake plate 29 on the opposite side from the plate 26. The brake material disc 27 is provided with a plurality of peripheral notches 27N spaced around the periphery thereof for providing the necessary locking action on the disc to prevent it from rotating. For this purpose, there is provided an energizable solenoid 28 mounted radially of the disc 27 and having a plunger 28P normally arranged in engagement with one of the notches 27N for the brake material 27 to prevent the disc from rotating. When the solenoid 28 is energized, the plunger 28P will be withdrawn from a notch 27N for the disc 27 and allow the disc 27 to rotate freely with the shaft.

To provide the necessary braking force there is provided in association with the floating brake plate 29 a braking spring 30 seated against the brake plate 29 at one end and having its opposite end seated against an adjustment collar 31 slidably mounted on the shaft 21. The collar 31 is preferably constructed of a U-shaped configuration to seat the free end of the spring 30 and having a central aperture mating with the shaft 31 to allow it to be slipped along the shaft 22 in both directions for adjusting the amount of spring force applied by the spring 30 to the floating brake plate 29 and thereby the amount of drag on the shaft 21. Once the collar 31 is adjusted it is secured to the shaft 21.

With this structure in mind, then, the operation of the controlled friction tape roller 16 may be appreciated. It sould be understood that as schematically illustrated in FIG. 1, the tape 15 will assume a wrap around the drum 20 of approximately 180°. The relationship, then, of the tape 15 and the drum 20 is such that in the normal operation the tape 15 will not slip over the shaft of the drum. The drive motor 12A for the reel 10, when the reel functions as a take-up reel, must exert sufficient torque to overcome the preselected amount of drag on the shaft 21 provided by the braking apparatus 25 to cause the rotation of the shaft 21 by the friction exerted between the tape 15 and the non-slip drum 20. It should now be apparent that with the necessary amount of torque developed by the motor 12A that the tension on the tape 15 extending between the roller 16 and the reel 10 will be increased so as to cause the advancement of the tape 15 onto the reel 10 so as to tightly wind the tape on the reel 10. It will not be recognized that the requisite amount of drag or tension on the tape 15 can be adjusted to assure the desired tight packing of the tape by moving the spring adjustment collar 31 along the shaft 21. It will also be recognized that through the provision of the solenoid 28 that when the tape transport apparatus is operated in other modes where the increased tension is not desirable such as during fast winding operations or tape pay out operations the solenoid 28 may be energized to release the brake apparatus 25 so that the roller 16 will operate in a normal tape guiding fashion. To this same end, it should be recognized that in a system such as illustrated in FIG. 1 that if the reel 10 is functioning as a take-up reel and the reel 11 is functioning as a supply reel that the controlled friction tape roller 17 may have its solenoid 28 energized so as to eliminate the high tension between the reel 11 and the roller 17. Alternatively, in some applications it will be found desirable to maintain a high tension on the tape 15 adjacent to both reels 10 and 11.

Now referring to FIG. 4, another embodiment of the controlled friction tape roller 16 will be examined. The controlled friction roller illustrated in FIG. 4 is identified by the reference numeral 16'. The controlled friction tape roller 16' is a simplified construction from that illustrated in FIGS. 2 and 3 but is less effective than the embodiment previously described. In this embodiment the controlled friction roller 16 is a modified, conventional tape guide roller construction that allows the tape 15 to slip over the outer surface of the roller 35. In this instance the roller 35 is arranged to be maintained in a stationary position. The requisite amount of friction is generated between the tape 15 and the roller 35 by providing the roller 35 with a material having the desired coefficient of friction for the particular type of paper employed for the paper tape 15. This material is selected relative to the type of "paper" that is employed for the tape 15 to provide the desired coefficeient of friction and thereby generate the necessary friction for providing the high tension in the tape as described hereinabove.

For the purposes of maintaining the roller 35 in a stationary position, one of the hubs 35H for the roller 35 is provided with a plurality of periphiral notches 35N, as in the previous embodiment, for accepting the plunger 28N of a release solenoid 28. As illustrated, the plunger 28N for the solenoid 28 is mounted in one of the notches 35N for securing the roller in a stationary position so as to allow the necessary amount of friction to be generated between the tape 15 and thereby the requisite amount of tension for tightly packing the tape on a reel. It should be recognized that this embodiment is only applicable where the variations in the friction due to the use of different materials for the tape 15 is not a problem. As contrasted with the first described embodiment, the first embodiment is operative with all known "tape" materials that are presently employed in paper tape applications.

What is claimed is:

1. In a tape transport system including at least a single rotatable tape storage reel having tape extending therefrom to be wound from a tape source and unwound therefrom, means for driving the storage reel to transfer tape thereto from the tape source, tensioning means coupled to the tape adjacent the storage reel for increasing the tension of the tape extending between the storage reel and said tensioning means whereby the tape wound on the reel is tightly wound thereon, said tensioning means comprising a rotatable drum and braking means arranged coaxially therewith for providing a preselected amount of drag for the drum and being arranged to be normally operative, and means for selectively rendering the braking means inoperative.

2. In a tape transport system as defined in claim 1 wherein the rotatable drum is adapted to normally prevent the tape advancing thereby from slipping thereover and rotating the drum against said braking means.

3. In a reel to reel tape transport system for transferring tape from one storage reel to another storage reel including a pair of rotatable tape storage reels mounted in a spaced apart relationship and having tape extending between the reels, means for driving each of the storage reels to transfer tape between the reels, tape guide means mounted adjacent each of the reels and engaging the tape extending between the reels for maintaining a preselected amount of tension on the tape, tape tensioning means arranged between the tape guide means and at least one of the storage reels for increasing the tape tension of the tape extending between said one reel and the tape tensioning means whereby when said one reel functions as a tape take-up reel the tape is tightly wound thereon, said tensioning means comprising a rotatable drum and braking means arranged coaxially therewith for providing a preselected amount of drag for the drum with the braking means arranged to be normally operative, and means for selectively rendering the braking means inoperative.

4. In a tape transport system as defined in claim 3 wherein the rotatable drum is adapted to normally prevent the tape advancing thereby from slipping thereover and rotating the drum against said braking means.

5. In a reel to reel tape transport system as defined in claim 3 including and means for selectively controlling the amount of force required to rotate the roller by the tape advanced thereby whereby the amount of tensionon the tape is controlled.

6. In a reel to reel tape transport system for transferring tape from one storage reel to another storage reel including a pair of rotatable tape storage reels mounted in a spaced apart relationship and having tape extending between the reels, means for driving each of the storage reels to transfer tape between the reels, tape guide means mounted adjacent each of the reels and engaging the tape extending between the reels for maintaining a preselected amount of tension on the tape, tape tensioning means arranged between the tape guide means and at least one of the storage reels for increasing the tape tension of the tape extending between said one reel and the tape tensioning means whereby when said one reel functions as a tape take-up reel the tape is tightly wound thereon, said tape tensioning means comprising a friction brake for controlling the drag on the roller and means for adjusting the braking force applied by the brake to thereby control the drag, said brake being arranged to normally apply said braking force, and means for selectively releasing the braking force.

7. In a reel to reel tape transport system as defined in claim 6 wherein the outer surface of the roller has a non-slipping surface.

* * * * *